United States Patent
Li et al.

(10) Patent No.: US 8,303,841 B2
(45) Date of Patent: Nov. 6, 2012

(54) METHOD FOR PREPARING CATHODE ACTIVE MATERIAL OF LITHIUM BATTERY

(75) Inventors: Ya-Dong Li, Beijing (CN); Xiao-Ling Xiao, Beijing (CN); Ding-Sheng Wang, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 195 days.

(21) Appl. No.: 12/879,171

(22) Filed: Sep. 10, 2010

(65) Prior Publication Data
US 2011/0175019 A1    Jul. 21, 2011

(30) Foreign Application Priority Data
Jan. 15, 2010    (CN) .......................... 2010 1 0044446

(51) Int. Cl.
*H01M 4/88*    (2006.01)
*C01G 45/12*    (2006.01)
*C01D 1/02*    (2006.01)
*H01M 4/13*    (2010.01)
*H01M 4/50*    (2010.01)

(52) U.S. Cl. ............... 252/182.1; 423/599; 423/594.15; 977/782; 429/224

(58) Field of Classification Search ............... 423/599, 423/594.15; 977/762; 252/182.1; 429/224, 429/128
See application file for complete search history.

(56) References Cited

U.S. PATENT DOCUMENTS

| | | | |
|---|---|---|---|
| 6,103,422 A * | 8/2000 | Kanai | 429/224 |
| 6,110,442 A * | 8/2000 | Xia et al. | 423/599 |
| 6,558,843 B1 * | 5/2003 | Han et al. | 429/224 |
| 6,773,851 B1 * | 8/2004 | Ferrando et al. | 429/224 |
| 6,924,064 B2 * | 8/2005 | Kondo et al. | 429/231.95 |
| 2002/0009645 A1 * | 1/2002 | Shima et al. | 429/224 |

FOREIGN PATENT DOCUMENTS

| | | | |
|---|---|---|---|
| CN | 1482068 | | 3/2004 |
| CN | 1482068 A | * | 3/2004 |
| JP | 2001180940 A | * | 7/2001 |

OTHER PUBLICATIONS

Morphology and electrochemistry of LiMn2O4 optimized by using different Mn-sources, Bao et al., Journal of Power Sources 164 (2007) 885-889.

Tang Xing-Fu et al., "Synthesis and Characterization of γ-MnOOH Nanorods with Tetragonal Prism Cross Section", Cninese Journal of Inorganic Chemistry, vol. 24, pp. 1468-1473, 2008.

* cited by examiner

*Primary Examiner* — Colleen Dunn
*Assistant Examiner* — Anthony J Zimmer
(74) *Attorney, Agent, or Firm* — Altis Law Group, Inc.

(57) ABSTRACT

A method for preparing a cathode active material of lithium battery is shown. The method includes providing MnOOH and lithium source material, and mixing the MnOOH and the lithium source material in a liquid solvent to achieve a mixture. Then, the mixture is dried to remove the liquid solvent, thereby achieving a precursor. A temperature of the precursor is elevated from room temperature to a sintering temperature of about 500° C. to about 900° C. at a uniform rate, and the precursor is sintered at the sintering temperature for about 3 hours to about 24 hours.

16 Claims, 5 Drawing Sheets

METHOD FOR PREPARING CATHODE ACTIVE MATERIAL OF LITHIUM BATTERY

CROSS-REFERENCE TO RELATED APPLICATIONS

This application claims all benefits accruing under 35 U.S.C. §119 from China Patent Application No. 201010044446.6, filed on Jan. 15, 2010 in the China Intellectual Property Office, the contents of which are hereby incorporated by reference.

BACKGROUND

1. Technical Field

The present disclosure relates to a method for preparing cathode active materials of batteries and, particularly, to a method for preparing a cathode active material of a lithium battery.

2. Description of Related Art

Lithium transition metal oxides are currently used as cathode active materials for lithium-ion batteries, such as spinel type lithium manganese oxide (e.g. $LiMn_2O_4$), olivine type lithium iron phosphate (e.g. $LiFePO_4$), and layered type lithium cobalt oxide (e.g. $LiCoO_2$). $LiCoO_2$ is a commonly used cathode active material in commercial lithium ion batteries, and has a stable structure and a high capacity. However, the high cost, toxicity, and limited abundance of cobalt have been recognized to be disadvantages of $LiCoO_2$. As a result, alternative cathode active materials have attracted much interest. One promising candidate is $LiMn_2O_4$. $LiMn_2O_4$ has the advantages of low-cost, environmental friendliness, good safety, and high abundance.

However, the capacity lost during cycling is the biggest disadvantage of the Spinel $LiMn_2O_4$. Shu-Juan Bao et al. have compared the $LiMn_2O_4$ made from different manganese sources (Morphology and electrochemistry of $LiMn_2O_4$ optimized by using different Mn-sources, Journal of Power Sources 164 (2007) 885-889), and found the $LiMn_2O_4$ synthesized by using MnOOH as the manganese source has a relatively good cycle ability and high-rate capability. However, in the article, the $LiMn_2O_4$ is prepared by heating or sintering several times. To prepare $LiMn_2O_4$, MnOOH and $LiNO_3$ are first mixed and grinded, and then annealed at 260° C. for 4 hours in air to form a precursor. After cooling and grinding, the precursor was calcined at about 610° C. for about 2 hours, and then calcined again at about 750° C. for about 12 hours, followed by slowly cooling to room temperature. The multi steps of thermal treating are complicated and disadvantageous for industrialized utilization.

What is needed, therefore, is to provide a simple and low cost method for preparing the cathode active material of a lithium battery suitable for mass production.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
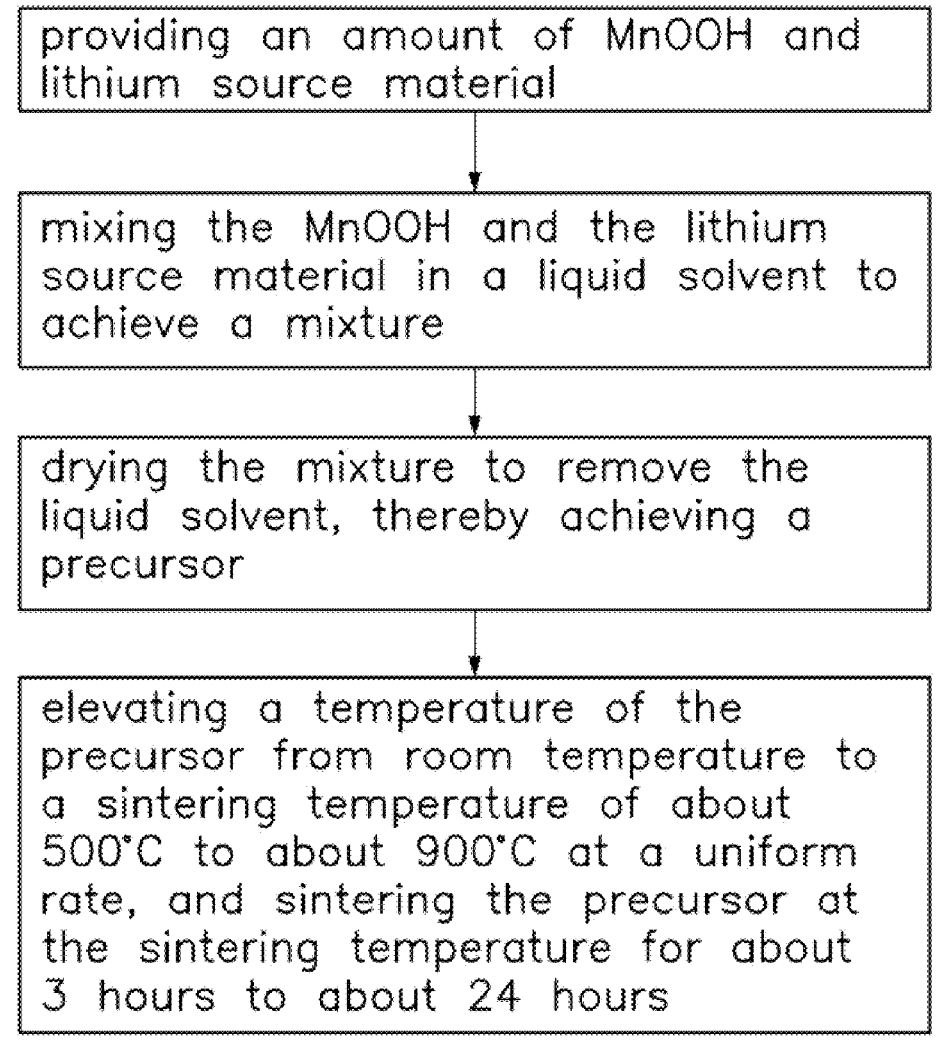
FIG. 1 is a flow chart of one embodiment of a method for preparing a cathode active material of a lithium battery.

Referring to FIG. 1, one embodiment of a method for preparing a cathode active material of lithium battery includes the steps of:

S1, providing an amount of MnOOH and lithium source material;

S2, mixing the MnOOH and the lithium source material in a liquid solvent to achieve a mixture;

S3, drying the mixture to remove the liquid solvent, thereby achieving a precursor; and S4, elevating a temperature of the precursor from room temperature to a sintering temperature of about 500° C. to about 900° C. at a uniform rate, and sintering the precursor at the sintering temperature from about 3 hours to about 24 hours.

In step S1, the lithium source material can be at least one of lithium hydroxide (LiOH) or commonly used lithium salt for cathode active material preparation, such as lithium carbonate ($Li_2CO_3$), lithium chloride (LiCl), lithium nitrate, lithium oxalate, lithium phosphate, lithium hydrogen phosphate, or lithium dihydrogen phosphate ($LiH_2PO_4$). The lithium source material may have a powder form or particle form. In one embodiment, the lithium source material is nanoscale in size. The MnOOH may be nano particles or nanorods. The MnOOH nanorods have a relatively large ratio of length to diameter, and have a nanosized cross section. The length of the MnOOH nanorods can be in a range from about 10 microns to about 50 microns. The MnOOH can be prepared by different methods.

In one embodiment, the MnOOH nanorods can be prepared by a method including following steps:

adding potassium permanganate ($KMnO_4$) and cetyl trimethyl ammonium bromide (CTAB) in deionized water; and receiving the deionized water with the $KMnO_4$ and CTAB therein into a hydrothermal autoclave, and hydrothermally reacting from about 6 hours to about 24 hours at a temperature of about 120° C. to about 180° C.

A mass ratio of the $KMnO_4$ to the CTAB is about 1:1 to about 3:1. In one embodiment, a weight of the $KMnO_4$ is about 0.5 g to about 1 g, and a weight of the CTAB is about 0.2 g to about 0.8 g.

Figure 2:
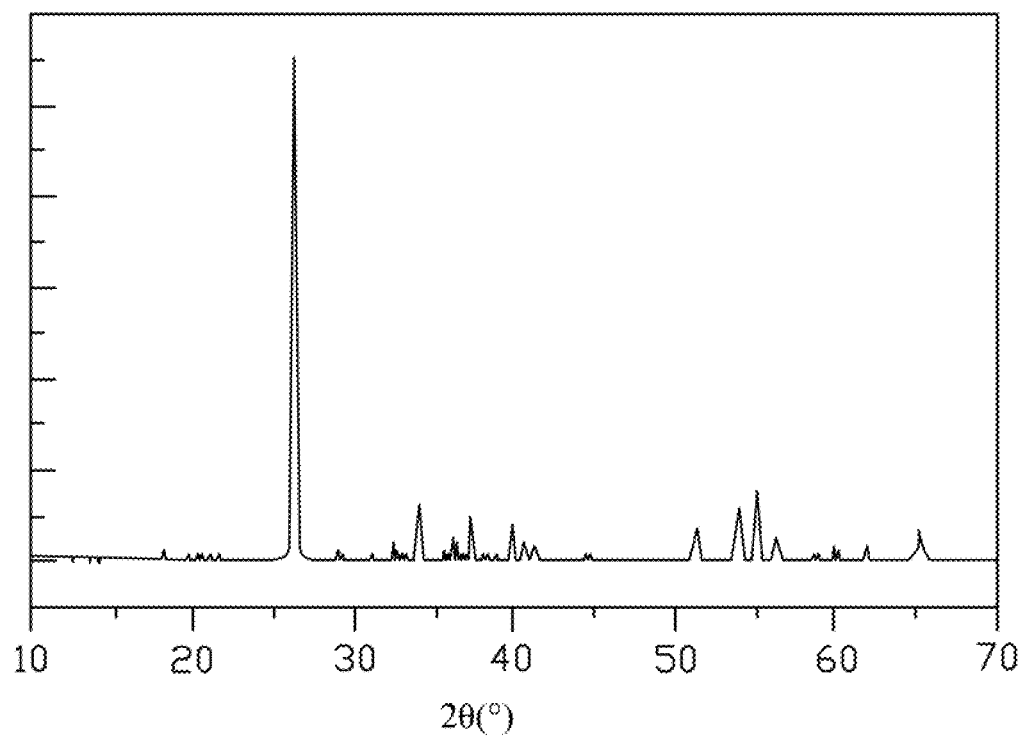
FIG. 2 is a graph showing a result of X-ray diffractometry (XRD) of a prepared MnOOH.
Figure 3:
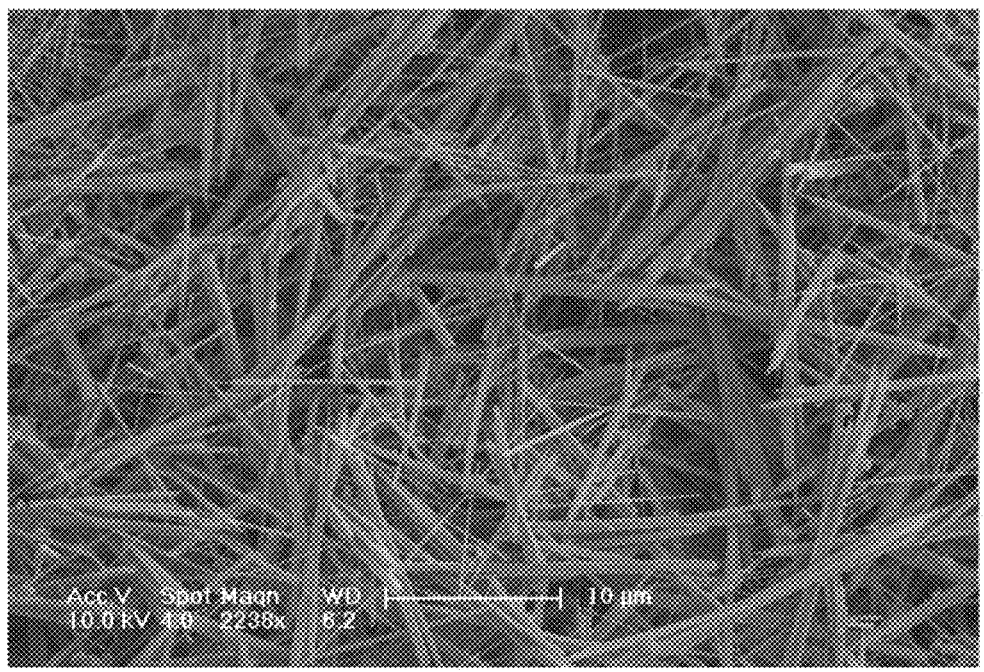
FIG. 3 is a photo showing a Scanning Electron Microscope (SEM) image of the prepared MnOOH.

Referring to FIG. 2, the XRD pattern indicates that MnOOH has been obtained by the above described method. Referring to FIG. 3, the MnOOH prepared by the above described hydrothermal method has a nanorod structure, with a length of about 10 microns to about 20 microns.

It is can be understood that, the MnOOH nanorods can also be prepared by other methods. For example, a MnOOH nanorod cluster can also be obtained by hydrothermally reacting manganese oxide ($MnO_2$) with ammonia ($NH_4OH$) at a temperature of about 200° C. for about 24 hours.

In step S2, a molar ratio of the Li element of the lithium source material to the Mn element of the MnOOH can range from about 1:2 to about 1:1. The amount of the liquid solvent can be set to achieve a good mobility of the mixture, and should not be too excessive to avoid a long drying period in step S3. The liquid solvent can have enough of an amount to obtain a paste of the mixture with relatively low viscosity. In one embodiment, a ratio of a total volume of the lithium source material and the MnOOH to a volume of the liquid solvent can range from about 1:1 to about 1:5. In one embodiment, the ratio of the total volume of the lithium source material and the MnOOH to the volume of the liquid solvent is about 1:2. The liquid solvent is easily evaporated and removed. The liquid solvent can be ethanol, isopropyl alcohol, or acetone that does not react with the lithium source material or dissolve the MnOOH. In one embodiment, the liquid solvent is ethanol.

By using the liquid solvent as a medium, the lithium source material can be uniformly mixed with the MnOOH, to avoid the segregation, aggregation, and differences among preparations.

The lithium source material and the MnOOH can be mixed in the ethanol by ball milling, grinding, stirring, or ultrasonically agitating the mixture. If the MnOOH nanorods are adopted, the shape of the nanorods is better maintained during the mixing step.

More specifically, during the mixing of the MnOOH nanorods with the lithium source material in the liquid solvent, a soft mixing method can be used, to avoid damaging the shape of the MnOOH nanorods. For example, MnOOH nanorods and the lithium source material can be ultrasonically agitated or magnetically stirred in the liquid solvent. The magnetic stirring can last from about 1 hour to about 3 hours. To achieve the $LiMn_2O_4$ nanorods, the mixing methods of ball milling and grinding may be avoided.

In step S3, the mixture can be dried in an oven to completely remove the liquid solvent. If the liquid solvent is ethanol, the mixture can be dried at a temperature of about 60° C. to about 80° C. The drying time is related to the amount of the liquid solvent. In one embodiment, the drying time is from about 1 hour to about 3 hours. It is to be understood that the mixture can also be dried at room temperature.

In step S4, the precursor can be sintered in air in a muffle furnace. During the sintering, the precursor is directly elevated to the sintering temperature, and then sintered at the sintering temperature for a predetermined time. In one embodiment, the sintering temperature is about 600° C. to about 800° C. The sintering time is related to the amount of the precursor. Before sintering, the temperature of the precursor is uniformly and slowly elevated to the sintering temperature in a period of time from about 3 hours to about 4 hours. In one embodiment, the weight of the precursor is about 30 g, the temperature elevating time is about 4 hours, the sintering temperature is about 750° C., and the sintering time is about 3 hours.

Figure 4:
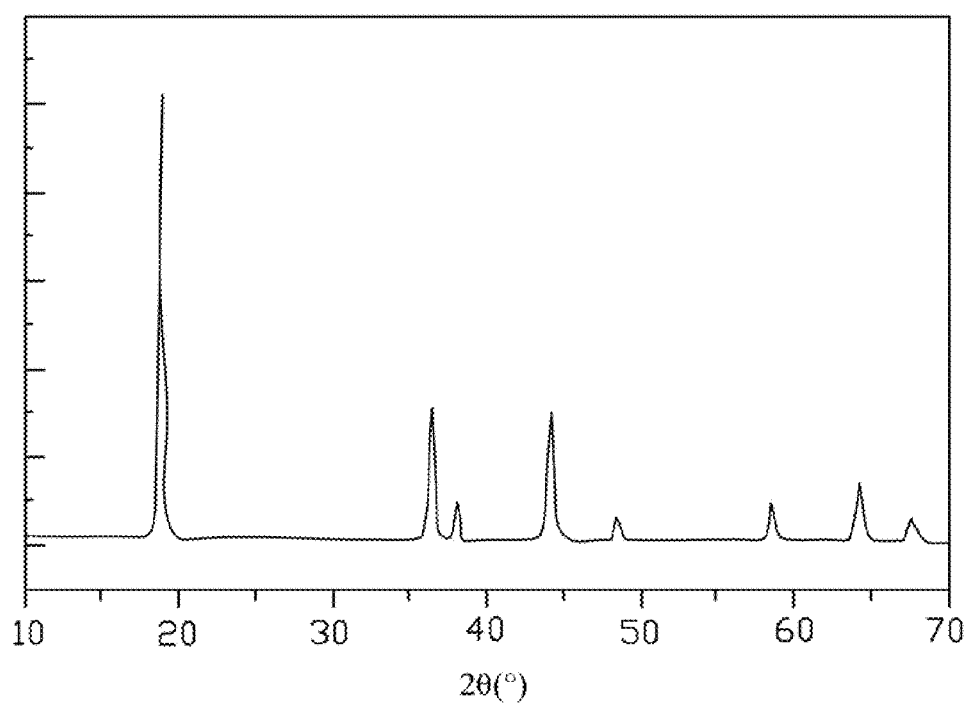
FIG. 4 is a graph showing a result of X-ray diffractometry (XRD) of a prepared cathode active material.
Figure 5:
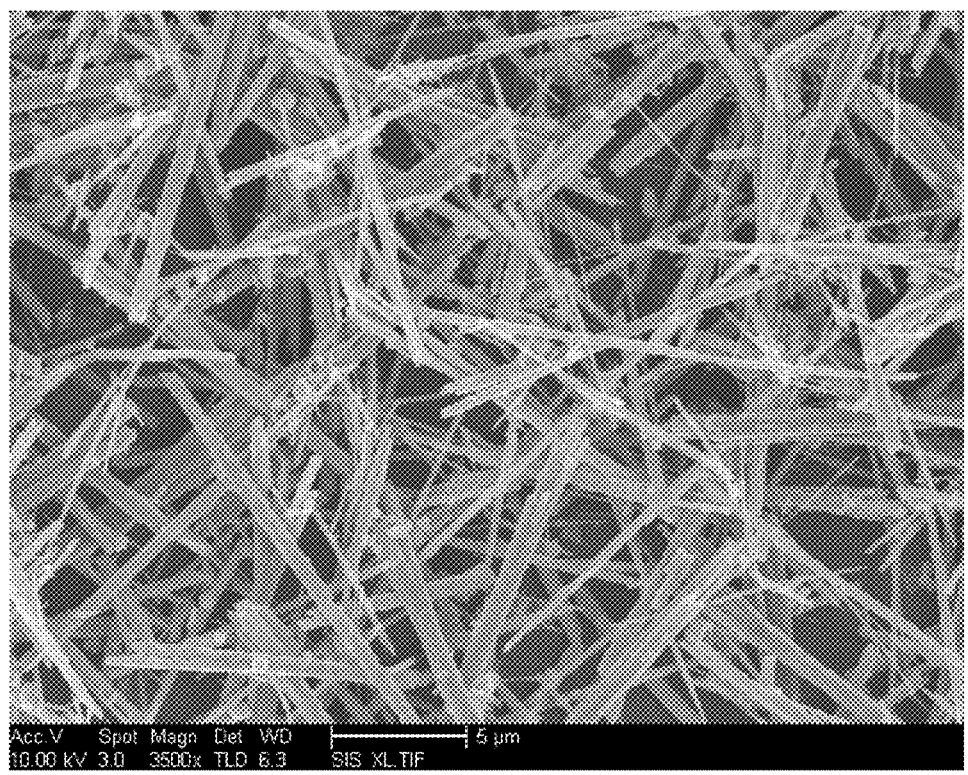
FIG. 5 is a photo showing an SEM image of the prepared cathode active material.

Referring to FIG. 4, the XRD pattern indicates that spinel $LiMn_2O_4$ with relatively high purity has been obtained by the above described method. Referring to FIG. 5, the obtained $LiMn_2O_4$ has the same nanorod shape as the MnOOH, and the sizes of the cross section of the $LiMn_2O_4$ nanorods are not apparently increased compared with that of the MnOOH nanorods. Therefore, during steps S2 and S3, the shape of the MnOOH has been maintained. Further, for the reason that in step S4, the single sintering step is used by elevating the temperature of the precursor directly from room temperature to the sintering temperature at a uniform rate, the reacting process of the MnOOH with the lithium source material to form the $LiMn_2O_4$ does not change the shape of the MnOOH nanorods. Accordingly, the $LiMn_2O_4$ nanorods can be achieved based on the shape of the MnOOH nanorods. The length of the $LiMn_2O_4$ nanorods is in a range from about 10 microns to about 50 microns. In one embodiment, the length of the $LiMn_2O_4$ nanorods is about 10 microns to about 20 microns.

The achieved $LiMn_2O_4$ nanorods used as the cathode active material in the lithium and the fabricated lithium battery is tested. The lithium battery containing the $LiMn_2O_4$ nanorods has a relatively high specific capacity and a high-rate capability.

The cathode electrode for electrochemical study is prepared by making a slurry of about 85 wt % cathode active material of $LiMn_2O_4$, about 10 wt % conducting carbon black, and about 5 wt % polyvinylidene fluoride (PVDF) binder in N-methyl pyrrolidone (NMP) as the solvent. The slurry is applied onto an aluminum foil current collector and dried at 100° C. for about 12 hours in an oven.

The electrolyte of the lithium battery includes $LiPF_6$ as a lithium salt, and a mixture of EC and DEC at a volume ratio of about 1:1 as a solvent. The molar ratio of the $LiPF_6$ in the electrolyte is about 1 mol/L. The anode is metal lithium. The lithium battery is cycled between about 3.5 V to about 4.3 V. The charge and discharge rates are respectively about 0.1 C and about 1 C. The specific capacity of the lithium battery can reach about 110 mAh/g at 0.1 C, and about 90 mAh/g at 1 C.

The present disclosure adopts a single sintering step to prepare the $LiMn_2O_4$ based on MnOOH as the Mn source material. During the preparation, the shape of MnOOH is maintained, and the $LiMn_2O_4$ nanorods are created.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for preparing a cathode active material of a lithium battery, the method comprising:
   providing MnOOH nanorods and lithium source material;
   mixing the MnOOH and the lithium source material in a liquid solvent to achieve a mixture;
   drying the mixture to remove the liquid solvent, thereby achieving a precursor; and
   elevating a temperature of the precursor from room temperature to a sintering temperature of about 500° C. to about 900° C. at a uniform rate, and sintering the precursor at the sintering temperature for about 3 hours to about 24 hours.

2. The method of claim 1, wherein the lithium source material is selected from the group consisting of lithium hydroxide, a lithium salt, and a combination thereof.

3. The method of claim 2, wherein the lithium salt is selected from the group consisting of lithium carbonate, lithium chloride, lithium nitrate, lithium oxalate, lithium phosphate, lithium hydrogen phosphate, lithium dihydrogen phosphate, and combinations thereof.

4. The method of claim 1, wherein a molar ratio of Li element of the lithium source material to Mn element of the MnOOH ranges from 1:2 to 1:1.

5. The method of claim 1, wherein the providing MnOOH nanorods comprises:
adding potassium permanganate and cetyltrimethyl ammonium bromide in deionized water; and
placing the deionized water with the potassium permanganate and the cetyltrimethyl ammonium bromide therein into a hydrothermal autoclave, and hydrothermally reacting for about 6 hours to about 24 hours at a temperature of about 120° C. to about 180° C.

6. The method of claim 5, wherein a mass ratio of the potassium permanganate to the cetyltrimethyl ammonium bromide is about 1:1 to about 3:1.

7. The method of claim 1, wherein a length of the MnOOH nanorods is about 10 microns to about 50 microns.

8. The method of claim 1, wherein the MnOOH nanorods and the lithium source material are ultrasonically agitated in the liquid solvent.

9. The method of claim 1, wherein the MnOOH nanorods and the lithium source material are magnetically stirred in the liquid solvent.

10. The method of claim 1, wherein the liquid solvent is selected from the group consisting of ethanol, isopropyl alcohol, acetone, and combinations thereof.

11. The method of claim 1, wherein the mixture is dried at a temperature of about 60° C. to about 80° C., for about 1 hour to about 3 hours.

12. The method of claim 1, wherein the cathode active material is nanorod shaped.

13. The method of claim 12, wherein a length of the cathode active material is from about 10 microns to about 50 microns.

14. The method of claim 1, wherein a ratio of a total volume of the lithium source material and the MnOOH to a volume of the liquid solvent is from about 1:1 to about 1:5.

15. The method of claim 1, wherein the sintering temperature is about 600° C. to about 800° C.

16. The method of claim 1, wherein the precursor is elevated to the sintering temperature in a period of time of about 3 hours to about 4 hours.

* * * * *